US006944620B2

(12) United States Patent
Cleraux et al.

(10) Patent No.: US 6,944,620 B2
(45) Date of Patent: Sep. 13, 2005

(54) FILE SYSTEM CREATOR

(75) Inventors: Christophe Cleraux, Sene (FR);
Philippe Basciano, Vannes (FR)

(73) Assignee: Wind River Systems, Inc., Alameda, CA (US)

( * ) Notice: Subject to any disclaimer, the term of this patent is extended or adjusted under 35 U.S.C. 154(b) by 488 days.

(21) Appl. No.: 10/287,319

(22) Filed: Nov. 4, 2002

(65) Prior Publication Data

US 2004/0088316 A1 May 6, 2004

(51) Int. Cl.[7] .............................................. G06F 17/30
(52) U.S. Cl. ..................... 707/101; 707/102; 707/206; 709/217; 717/138
(58) Field of Search ............................ 707/1, 10, 101, 707/102, 206; 709/201, 203, 217–229; 710/10, 15, 16; 711/103; 714/5; 717/127, 138, 169, 178

(56) References Cited

U.S. PATENT DOCUMENTS

| 4,205,371 | A | * | 5/1980 | Feather ........................ 707/101 |
| 5,283,868 | A | * | 2/1994 | Baker et al. ................. 709/227 |
| 5,657,448 | A | * | 8/1997 | Wadsworth et al. ........ 709/220 |
| 5,669,000 | A | * | 9/1997 | Jessen et al. ................ 717/127 |
| 5,696,899 | A | * | 12/1997 | Kalwitz ....................... 709/228 |
| 5,701,502 | A | * | 12/1997 | Baker et al. ................. 709/201 |
| 5,815,722 | A | * | 9/1998 | Kalwitz et al. ............. 717/178 |
| 5,841,991 | A | * | 11/1998 | Russell ........................ 709/221 |
| 6,446,094 | B1 | * | 9/2002 | Egolf et al. ................. 707/206 |
| 6,480,845 | B1 | * | 11/2002 | Egolf et al. .................... 707/6 |
| 6,658,587 | B1 | * | 12/2003 | Pramanick et al. ............ 714/5 |

* cited by examiner

*Primary Examiner*—Shahid Al Alam
(74) *Attorney, Agent, or Firm*—Davidson, Davidson & Kappel, LLC

(57) ABSTRACT

A method for creating a second file system on a device implementing a first file system is provided. One or more first files are selected from a set of files. The files comprise one or more characteristics particular to the second file system. One or more ancestors of the first files are selected automatically. The ancestors comprise one or more characteristics particular to the second file system. Based on the first files and the ancestors, data is generated to emulate one or more of the first files and the ancestors (and/or characteristics of one or more of the first files and the ancestors) that the first file system does not support. A file system comprising the first files, ancestors, and the data is generated.

24 Claims, 15 Drawing Sheets

UNIXStat
VER=1.0

Default global definition

\set permfile=0775 (410)
\set permdir=0750 (420)
\set permdev=0664 (430)
\set uid=132 (450)
\set gid=100 (460)
\set perm= 000 (440)
\set atime=12 (470)
\set ctime =5 (480)
\set mtime=12.5 (490)

Files specifications

/tmp    permdir=1755 gid=0 uid=0
/usr/tmp  hlink=/tmp (415)
/etc    perm=755 \
      gid=0 uid=0
/dev    perm=755 \   (435)
      gid=0 \
      uid=0
/dev/null dev=c,3,1 permdev=0666 gid=0 uid=0 # new device node
/usr/namedPipe dev=p   # Creation of a named pipe
/bin "/usr/sbin/My Application" perm=0740 gid=0 uid=0
/sbin/app slink="/usr/sbin/My Application" \ (425)
      uid=0 \
tag     gid=0 (455)
/usr/src/aux map=_aux tag=src-package.tar.gz special variable map /usr/src=/dev/src (445)

Fig. 3

NAME: SQUID        610
PARENT: APACHE  620
PARENT: MISC-UTILITIES
DEPENDENCY: PROXY+   630
DEPENDENCY: PROXY++
PACKAGE: SQUID.tgz.mnf   640

/d1/f1 [,size=sz] [,type=ty] [,mode=md] [,linkname=lnkn] [,major=mj] [,minor=mn]
/d1/d4 [,size=sz] [,type=ty] [,mode=md] [,linkname=lnkn] [,major=mj] [,minor=mn]
/d1/d2/f2 [,size=sz] [,type=ty] [,mode=md] [,linkname=lnkn] [,major=mj] [,minor=mn]

FILE SYSTEM CREATOR

A portion of the disclosure of this patent document contains material which is subject to (copyright or mask work) protection. The (copyright or mask work) owner has no objection to the facsimile reproduction by any one of the patent disclosure, as it appears in the Patent and Trademark Office patent files or records, but otherwise reserves all (copyright or mask work) rights whatsoever.

BACKGROUND INFORMATION

A computer program can be viewed as a detailed plan or procedure for solving a problem with a computer: an ordered sequence of computational instructions necessary to achieve such a solution. The distinction between computer programs and equipment is often made by referring to the former as software and the latter as hardware. An operating system (OS) is a set of programs that controls the interaction between applications and hardware. The OS also controls the interaction between different applications. The OS also provides generalized system services to application programs, such as utility and daemon programs. These system services conventionally include access to hardware peripheral devices attached directly or indirectly to the computer system. For example, the OS provides access to system hardware (e.g., by device drivers), and access to the file system on the hardware (e.g., by file system utilities.)

UNIX™, Windows™, and MacOS™ are examples of OSes. There are different varieties of UNIX™, such as FreeBSD™ and LINUX™, and different versions of Windows™, such as Microsoft's Windows NT™ and Windows 2000™. WindRiver's BSD/OS™ is a UNIX based OS derived from 4.4BSD Lite-1™. There are also different versions of MacOS™, such as MacOS 9.0™ and MacOS X™. Different OSes use different file systems for file access. For example, Windows NT™ uses "Win32" file systems, such as, FAT, or NTFS, while UNIX type systems use different types of file systems, such as UFS/FFS (Unix File System and Fast File System) or ext2fs. UFS is a superset of FFS. UFS file system supports features that are not supported in Win32 file systems. Files types that are supported by the Win32 file system are referred to herein as "regular files", whereas UNIX features or other files that are not supported by the Win32 file system are referred to herein as UNIX features and special UNIX files. For example, special UNIX files include hard links, soft links, FIFOs (First In First Out special file), named sockets and devices. UNIX features (also referred to herein as "characteristics") include the access permissions, the owner, and the group definition of a file.

Hard links are used to bind a file to a particular name in the file system. Symbolic links (e.g., soft links) are used to bind a particular file name to another file or directory name and may, for example, be used to by-pass some limitations of the hard links. A file or directory can be bound to more than one symbolic link. A FIFO allows data to be entered into a file and removed in the order that it was entered in. A FIFO may be opened by multiple processes for reading or writing. A device file allows an application to access a special hardware device of the computer. A named socket is used by processes of a same system to communicate. Each process can read/write information into a socket. Access permissions allow a user to designate, on a file by file or directory by directory basis, who has permission to read and write to a particular file or directory. The UNIX features (also referred to herein as "characteristics") for the owner and group allow categorizing the access permission into three categories: the owner, the group and the others.

During development of an embedded application, it is often advantageous to use a target computing environment (e.g., a "target") and a host computing environment (e.g., a "host"). The target is the device for which the application is being developed, and the host is used to develop the application for the target. In many circumstances, the target and host use different OSes (e.g., the host may run a Windows OS and the target may run a UNIX OS.)

Often, due to memory constraints, system administrative issues, or to simplify the development process, a process run on a target uses files stored on the host. Also, during the development process or the release process, it may be necessary to create on the host a file system for the target, i.e. a file system that the target OS can manage.

Sun Microsystem's NFS (Network File System) is an example of a software package that allows a target system to access files that are located on the host system. In NFS, files are loaded into the memory on the target as needed, so that there is no need to store the files on the target file system. To implement this, NFS mounts a directory on the target file system to a remote directory on the host. The host and target communicate in NFS via different commands set forth in the publicly available NFS protocol. As the host file system may not be able to handle all the file types or features of the target file system, such file types are located on the target file system.

In order to simplify the task of creating the file system, a file system creator is used to create on the host a file system for the target. One such file system creator is the TCT (Target configuration tool) by Montavista. However, the TCT only operates in a system where the Linux OS is running on both the target and the host system.

SUMMARY

A system and method for creating a second file system on a device implementing a first file system is provided. One or more first files are selected from a set of files. The files comprise one or more characteristics particular to the second file system. One or more ancestors of the first files are selected automatically. The ancestors comprise one or more characteristics particular to the second file system. Based on the first files and the ancestors, data is generated to emulate one or more of the first files and the ancestors (and/or characteristics of one or more of the first files and the ancestors) that the first file system does not support. A file system comprising the first files, ancestors, and the data is generated.

A system and method for creating a second file system on a device implementing a first file system is provided. One or more first files are selected from a set of files. The files comprise one or more characteristics particular to the second file system. One or more ancestors of the first files are selected automatically. The ancestors comprise one or more characteristics particular to the second file system. Based on the first files and the ancestors, data is generated to emulate one or more of the first files and the ancestors (and/or characteristics of one or more of the first files and the ancestors) that the first file system does not support. A script based on the first files, ancestors, and the data is generated. The second file system comprising the first files, ancestors, and the data is generated.

A system and method for creating a second file system on a device implementing a first file system is provided. One or more first files are selected from a set of files. The files comprise one or more characteristics particular to the second file system. One or more ancestors of the first files are selected automatically. The ancestors comprise one or more characteristics particular to the second file system. Based on the first files and the ancestors, data is generated to emulate one or more of the first files and the ancestors (and/or characteristics of one or more of the first files and the ancestors) that the first file system does not support. The second file system comprising the first files, ancestors, and the data is generated at a first location.

A system and method for creating a second file system on a first device implementing a first file system is provided. One or more first files are selected from a set of files. The files comprise one or more characteristics particular to the second file system. One or more ancestors of the first files are selected automatically. The ancestors comprise one or more characteristics particular to the second file system. Based on the first files and the ancestors, data is generated to emulate one or more of the first files and the ancestors (and/or characteristics of one or more of the first files and the ancestors) that the first file system does not support. The second file system comprising the first files, ancestors, and the data is generated on a second device.

In accordance with further embodiments of the present invention, computer readable media are provided, having stored thereon, computer executable process steps operative to control a computer to implement the embodiments described above.

BRIEF DESCRIPTION OF THE DRAWINGS

FIG. 3 is illustrative of an exemplary configuration file for an emulation library.

FIG. 5 shows an exemplary package.

FIG. 6 shows an exemplary manifest file for a package.

FIG. 8 shows an exemplary tree with first, second, third, fourth, and fifth default package.

FIG. 9 shows an exemplary tree showing duplicated packages.

DETAILED DESCRIPTION OF THE PREFERRED EMBODIMENTS

In an embodiment according to the present invention, a file system creator tool is provided on a host system. Using this tool, one or more first files are selected from a set of files. The files comprise one or more characteristics particular to the second file system. One or more ancestors of the first files are selected automatically. The ancestors comprise one or more characteristics particular to the second file system. Based on the first files and the ancestors, data is generated to emulate one or more of the first files and the ancestors (or characteristics of one or more of the first files and the ancestors) that the first file system does not support. A script (preferably a "tash script") based on the first files, ancestors, and the data is preferably generated. A file system comprising the first files, ancestors, and the data is then generated. In embodiments utilizing the tash script, a tash interpreter on the host system can be used to generate the file system on a target system.

Preferably, this tool provides a method to create a target file system from a common repository (i.e. a set of files and their respective rights, ownership, etc.) and from a host file directory. This host file directory is accessible from the tool itself, and can contain the user applications that may be embedded in the target. In an embodiment implementing BSD/OS, the repository would include the system files for BSD/OS, while the host file directory would include the user applications to be embedded in the target with BSD/OS.

Prior to discussing the preferred embodiments of the file system creator, it is helpful to discuss an exemplary environment in which the file system creator can be used. One such environment is shown in FIGS. 1–4, and described in more detail in patent application Ser. No. 10/287,225, filed Nov. 4, 2002 (now pending), and entitled "Cross Platform File System Emulation System", the entire disclosure of which is hereby incorporated by reference.

Figure 1:
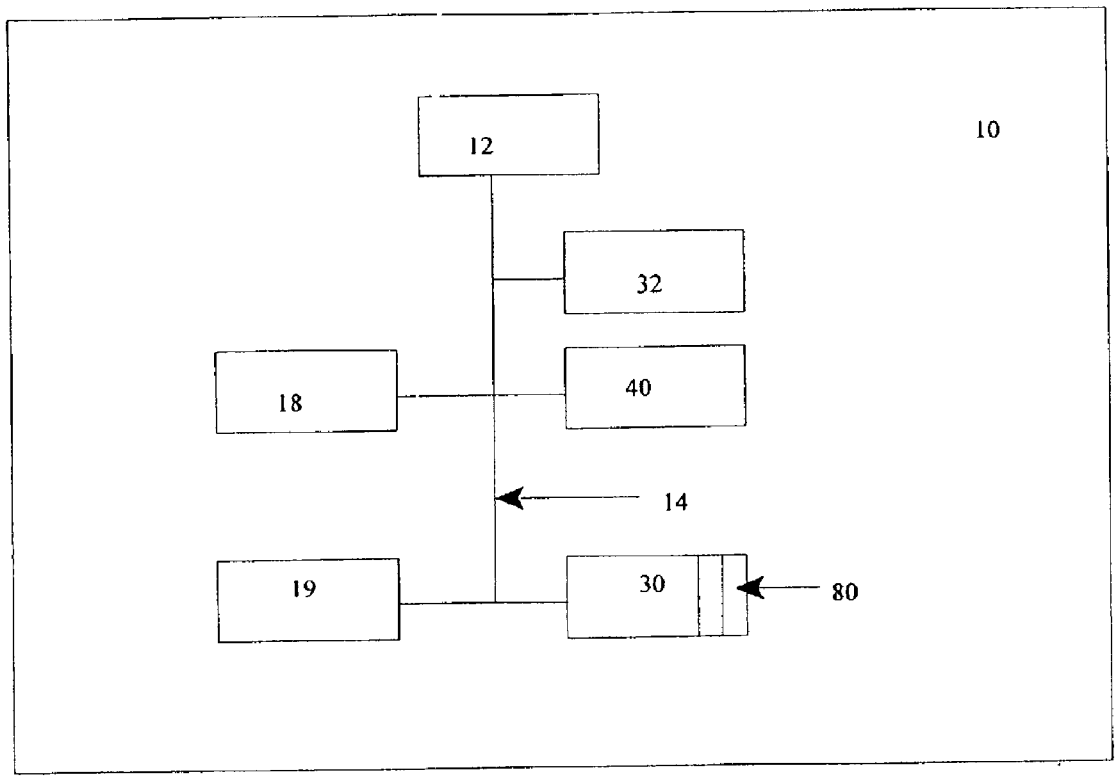
FIG. 1 shows a computer system.

FIG. 1 shows an exemplary computer system 10. The computer system 10 includes a central processing unit (CPU) 12 coupled through a system data bus 14 and a network interface 18. Also included is a non-volatile storage device (e.g., a hard drive) 30 and a volatile storage device (e.g., RAM) 32. The operation of the network interface 18 is sufficient to support the reading of data (e.g., executable, data, and configuration files) from a non-volatile resource (e.g., a hard drive or another computer system 10). A video display device 19 is also provided as a peripheral device coupled to the system bus 14. Other peripherals 40 may also function as part of the computer system 10. These other peripherals 40 may include, for example, controllers supporting audio and real-time video, or SCSI device controllers. An OS, which can be located on the non-volatile storage device 30 or in volatile storage device 32, is configured to function with the system data bus 14, network interface 18, video display device 19, non-volatile storage device 30, volatile storage device 32, and other peripherals 40. Located on the non-volatile storage device 30 are a plurality of files 80 arranged in a file system. Preferably, the OS uses a file system driver to access the files 80 of the file system. The files 80 may also be used to communicate with the devices 14,18,19,30,32,40 on the system or another system. For example, in a UNIX system files 80 that define symbolic links can be used to facilitate communication within the file system. Likewise, files 80 that specify device drivers can be used to allow the OS to communicate with the devices 14,18,19,30,32, 40.

Figure 2:
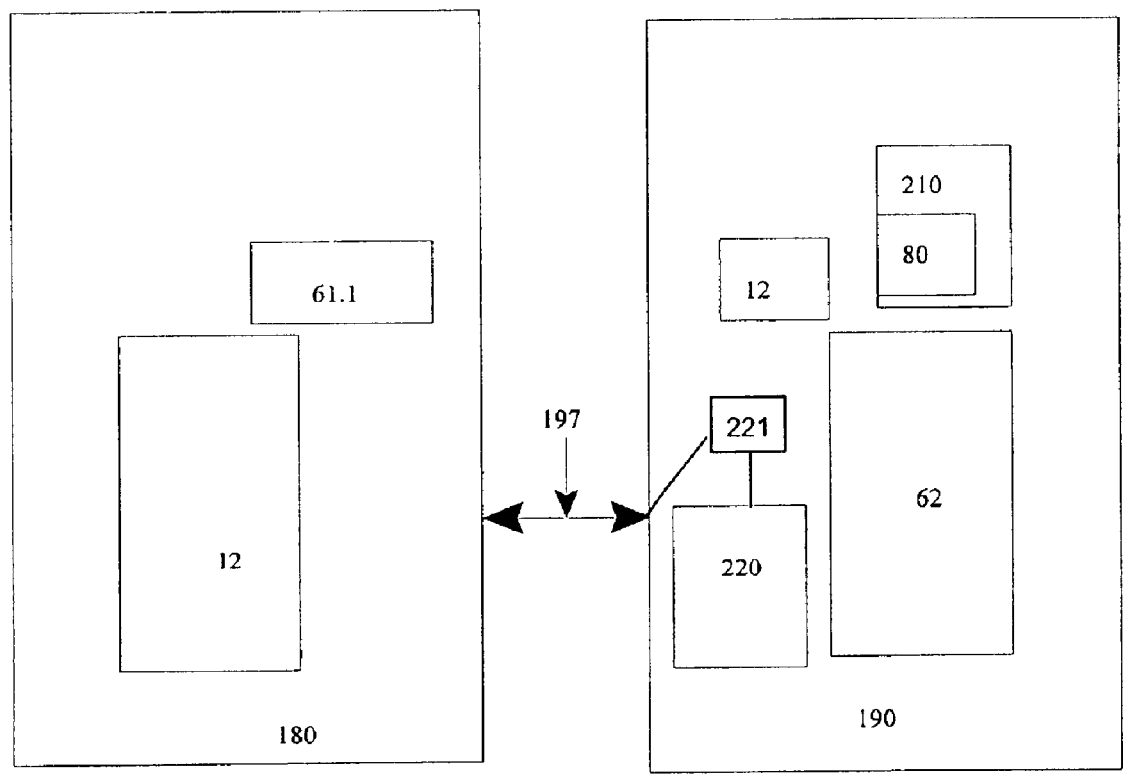
FIG. 2 shows a target system and a host system in a first embodiment of the present invention

FIG. 2 shows a target computing environment 180 (hereinafter "target system") and a host computing environment 190 (hereinafter "host system"). The target system 180 and host system 190 may have the same architecture as the system 10 shown in FIG. 1. However, in certain embodiments according to the present invention, the non-volatile memory 30 device is not present or is minimized on the target system 180. Also, in certain embodiments according to the present invention, the files 80 are not present on the target system 180. Similarly, the target 180 may not include the display device 19 or peripherals 40. A communication link 197 is present between target system 180 and host system 190. The communication link 197, could be, for example, a wireless link (e.g., a wireless network) or a direct link (e.g., copper cable). Moreover, the host system 190 could be a system comprising a plurality of processing devices (e.g., a distributed network or cluster).

A host OS 62 executes on the host system 190. The file system of the host system 190 (for example, a Win32 file system) includes a repository 210 for storing one or more files 80 used by the target system 180 and an emulation library 220. The emulation library 220 can be linked with any application of the host system 190 (e.g., an NFS server, a File System Creator tool, a shell application, or file utilities). The emulation library 220 provides common functions to the host application, so that the host application can access a sub-set of the host file system as if it is the target file system. For example, if the host file system format is a Win32 file system and the target file system format is a UFS file system, the emulation library (e.g., a UNIX file library) provides functions that act like common UNIX functions to access a desired sub-set of the Win32 file system as if it is a UFS file system. A configuration file is used to configure the emulation library (e.g., for a particular system). An exemplary configuration file is shown in FIG. 3.

A server process (e.g., an NFS server) 221 linked with the emulation library 220 allows the target system 180 to request information and files from the host repository 210. The server process 221 is used by the host system 190 to send back requested information to the target system 180.

Preferably, target 180 has stored thereon only a boot loader. The boot loader can, for example, be stored on an EPROM (erasable programmable read-only memory) or Flash memory. A boot loader is a program that initiates execution of the OS 61.1. All other files, including OS and application files reside on the host system 190. As the processor 12 executes, it loads the necessary OS and application files into memory as needed. To do this, the target 180 requests the needed files from the host system 190. In this manner, the OS 61.1 executes on the target 180, despite the fact that only a boot loader is stored in non-volatile memory on the target 190.

When the OS 61.1 detects that needed information is not in memory 32, the OS 61.1 sends a request to the host system 190 for a file 80 that comprises the information. For example, if the OS 61.1 needs a file to perform a function or to allow an application executing on it to perform a function, the OS 61.1 sends a request to the host system 190. Preferably, the request and the host's response thereto are sent via the NFS protocol (e.g., by a stat command). The nature and format of the NFS protocol are well known and therefore will not be discussed herein. In any event, when the request for file information is received at the host 190 by the server process 221, the server process 221 queries the emulation library 220 for the file information. The emulation library 220, in turn, checks the repository 210 and an internal database for the file information (as used herein, the term "emulation library" refers to the library in general, including the internal database). In this regard, if the requested file is a regular file, the emulation library 220 will retrieve the file 80 from the repository 210. However, if the requested file is a special UNIX file, such as a device file, the emulation library 220 will access its internal database to retrieve the information for that special UNIX file. The emulation library 220 includes information (e.g., data) sufficient to emulate the special UNIX files and the UNIX features, also referred to herein as characteristics. The emulation library 220 uses the information to generate an answer to the server process 221, which transmits the information to the target 180 via a responsive command (e.g., an NFS command). In certain preferred embodiments of the present invention, the emulation library 220 combines the information from the repository 210 with information from its internal database. For example, the emulation library 220 might insert UNIX permissions in a response to the request for a regular file in the repository 210.

Preferably, the host system 190 uses a Win32 file system, and the target system 180 uses a UNIX file system (e.g., UFS). Most preferably, the OS 61.1 is WindRiver's BSD/OS, using the UFS file system. In certain embodiments according to the present invention where the server process is an NFS server, the host system 190 and the NFS server can process NFS commands for one or more target systems. As noted above, FIG. 3 is illustrative of an exemplary configuration file of the emulation library 220 (e.g., a UNIX file library) and the emulation library 220 comprises data to emulate a UNIX file system on a Win32 file system.

The configuration file of the emulation library 220 defines the behavior of the emulation library 220 for the files 80 in the repository 210 managed both globally (e.g., by a global variable), and on a file by file basis (e.g., by overloading a variable). Preferably, the values of the global variables are defined by a special command '\set'. A plurality of global variables can be used in the configuration file of the emulation library 220. For example, a permfile variable 410 can be used to define the default permission value for a file. A permdir variable 420 can be used to define the default permission value for a directory. A permdev variable 430 can be used to define the default permission value for a UNIX device file. A uid variable 450 can be used to define the default numeric user ID ("UID") of the file or directory. A gid variable 460 could be used to define the default numeric group ID ("GID") of the file or directory. An atime variable 470 can be used to define the default access time of a file or directory. A ctime variable 480 can be used to define the default status-changed time of a file or directory. A mtime variable 490 can be used to define the default modification time of a file or directory. On a file by file (or directory by directory) basis, a perm variable 440 can be used to define the permission value for the file (or directory). Preferably, the value of all the global variables can be overloaded (e.g., overwritten) on a file by file (or directory by directory) basis.

A plurality of special variables may also be used in the configuration file of the emulation library 221. For example, an hlink variable 415 can be used to define a hard link. Preferably, the hlink variable 415 uses a string for defining the target of the link. An slink variable 425 can be used to define a soft (symbolic) link. Preferably, the slink variable 425 uses a string for defining the target of the link. A dev variable 435 defines UNIX device file, a FIFO and/or a named socket. Preferably, the dev variable 435 uses a syntax to define the values and the type of the device file, FIFO, or named socket.

A plurality of special purpose variable names can also be present in the configuration file of the emulation library 220. For example, a tag identifier 455 can be used to select all entries marked with a specific tag.

If the data for a particular feature of the UNIX directory is not present, a default is used. Most preferably, defaults are defined for permission access, UID, and GID.

It should be noted that the configuration file is used to initialize the emulation library and is not consulted by the emulation library during execution of the emulation library. Preferably, however, when the operation of the emulation library changes the initialized data (e.g., a new file is created, or permissions are changed), these changes are written back into the configuration file by the emulation library.

The configuration file of the emulation library 220 is preferably a text file, such as the file of FIG. 3. However, it should be understood that other file formats are possible, such as a binary file, a plurality of binary files, or a plurality of text files. Most preferably, each line in the file defines either a command or a file.

Figure 4:
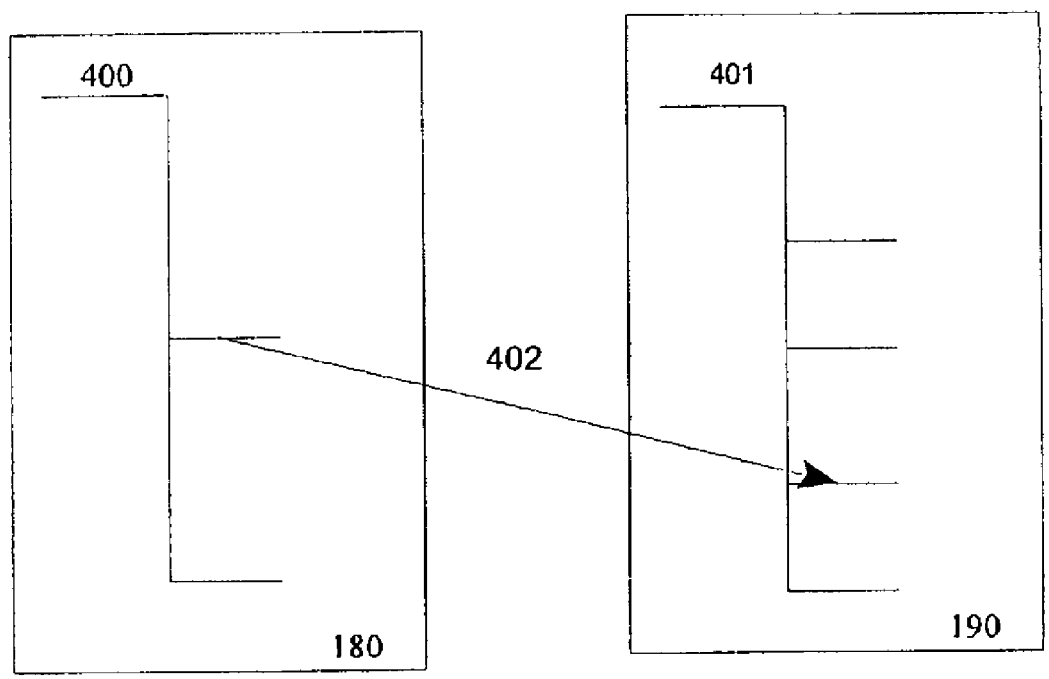
FIG. 4 shows a first and second directory structure.

FIG. 4 illustrates a first and second directory structure 400,401. The directory structures 400,401 are representations of the file systems on the target system 180 and on the host system 190, respectively. The first directory structure 400 can be implemented on a UNIX file system (e.g., UFS), and the second directory structure 401 can be implemented on a Win32 file system. Preferably, the names of files or directories that are needed by the target system 180, but are not present on the target system 180, are present in the first directory structure 401. However, since the file or the directory is not on the target system 180, a pointer 402 is provided in place of the file or the directory. The pointer 402 points to the corresponding file or directory on the second directory structure 401. In certain embodiments, the repository 210 of the host system 190 can be mounted onto the first directory structure 400, for example, by NFS.

When the target OS 61.1 needs a particular file or directory, it looks for the file in the first directory structure 400. If the file is not present, the link 402 directs the target OS 61.1 to the location of the file in the second directory structure 401. The target OS 61.1 then sends a request for the file to the host system 190. Preferably, the request is sent by NFS. The server process 221 on the host system 190 uses the data in the request to create a valid file or directory request to the emulation library 220. The emulation library 220 locates the requested file or directory in the second directory structure 401 and/or emulates the file or characteristics thereof. Once the file is found and/or emulated, it or characteristics thereof are returned to the target system 180. Preferably, the request to the host system 190 is transparent from the point of view of the target OS 61.1.

In accordance with an embodiment of the present invention, the file system creator can be used to generate, on the host, a file system for the target. Moreover, the file system creator can be used in the system of FIG. 2 to ensure that the correct files are present on the host system 190, the correct data for the files is present in the database 220, and/or the directory structures 400,401 are correct. The file system generated by the file system creator and the host can later be transmitted to a storage device on the target (e.g., an EPROM or hard disk). FIGS. 5–14 detail the different components used by a preferred embodiment of the file system creator, while FIG. 15 details the method used by that embodiment.

FIG. 5 shows an exemplary package 666. The package 666 comprises data used by the file system creator to create the file system on the host 190. For example, the packages 666 have lists of files that are placed on the host 190 by the file system creator. Preferably, there are two types of packages: optional packages and default packages. Default packages are system and application packages that do not use other packages. Optional packages are packages which are not mandatory for system completion. Optional packages could be provided by third parties. Preferably, the system files (which are generic to any given file system (e.g., any BSD/OS file system)) are located in a common repository, whereas the application files (e.g., user applications which may be present in only some BSD/OS file systems, for example) are located in a separate location (e.g., a host file directory).

The package 666 comprises a plurality of fields. A name field 610 describes the package name. A dependency field 630 in the package 666 lists any default packages that the particular package uses. A parent field 620 is used to describe any parent package for the package 666 (e.g, a package which has the package 666 in its dependency field). A package field 640 lists one or more manifest files. Manifest files list where the files that comprise a package reside. An exemplary manifest file is shown in FIG. 6. Preferably, the fields in the package 666 are character strings. Most preferably, the package 666 is a ".def" text file.

FIG. 6 shows an exemplary manifest file for a package 666. The manifest file includes absolute file paths. In certain embodiments of the present invention, the file paths may be followed by optional fields. For example, the optional fields could include the size of a file in bytes, the file type, a mode, a linkname, a major, and a minor. The file type could be REG, directory (e.g., dir), SOCK, FIFO, character (e.g., CHAR), BLCK, link (e.g., LNK), or hardlink (e.g., HRDLNK). The mode could be 4 digits in octal and comprise the rights for the file. The linkname shows the destination path of a link file type (e.g., LNK). Major and minor are used to identify a particular version.

Figure 7:
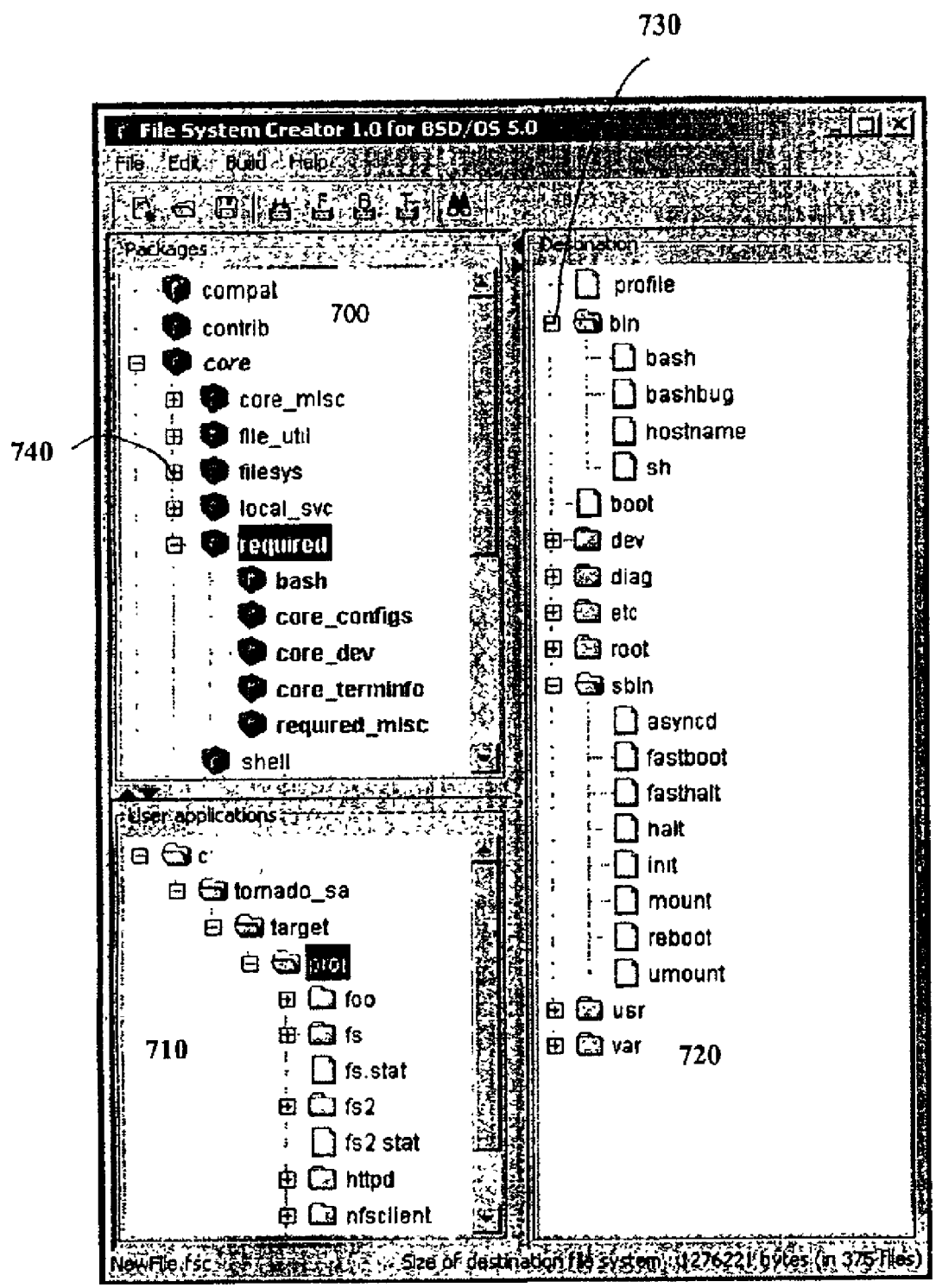
FIG. 7 is illustrative of a main panel for a UI (Universal Interface) in one embodiment of the present invention.

FIG. 7 is illustrative of a main panel for a UI (e.g., a user interface such as the Universal Interface shown) in an embodiment of the present invention. The UI allows a user to select packages 666 that will comprise the resulting file system for the target. Preferably, the UI can be used on a Windows OS. However, it should be understood to one skilled in the art that the UI can be used on a variety of different OSes. A first, second and third panel 700,710,720 are shown. The first panel 700 is used to display packages. The second panel 710 is used to display the project tree, and the third panel 720 is used to show the destination directories of the selected packages.

In the first panel 700, a package tree 740 is used to display packages 666 and files thereof that can be selected by the user. Preferably, a user selects a package by selecting it (e.g., clicking on it, using a mouse) and each node of the tree 740, preferably, represents a particular package. When a default package is selected, all the default sub-packages that comprise the package are selected also. The default sub-packages are displayed as sub child nodes below the selected node. If there is an optional package included as one of the sub-packages, it is not selected. However, if the user selects an optional package, then the first default package and all of the first default package's sub-packages are selected. This is shown in more detail in FIGS. 8 and 9 (discussed below). Preferably, a right mouse click on any of the packages or selecting of a properties button shows a dialog box with information that pertains to the package (shown in FIG. 10). The data can include, for each file, a UID/GID (User ID or Group ID), a size, one or more permissions, a type (e.g., executable (runnable), text file, data file, and shared library), and the package that comprises the file.

In certain embodiments according to the present invention, a user can drag and drop any additional user application files (e.g., a database, a network tool, or any user software which is included from any provided packages) to required locations from a host file directory accessible from the file system creator.

Figure 14:
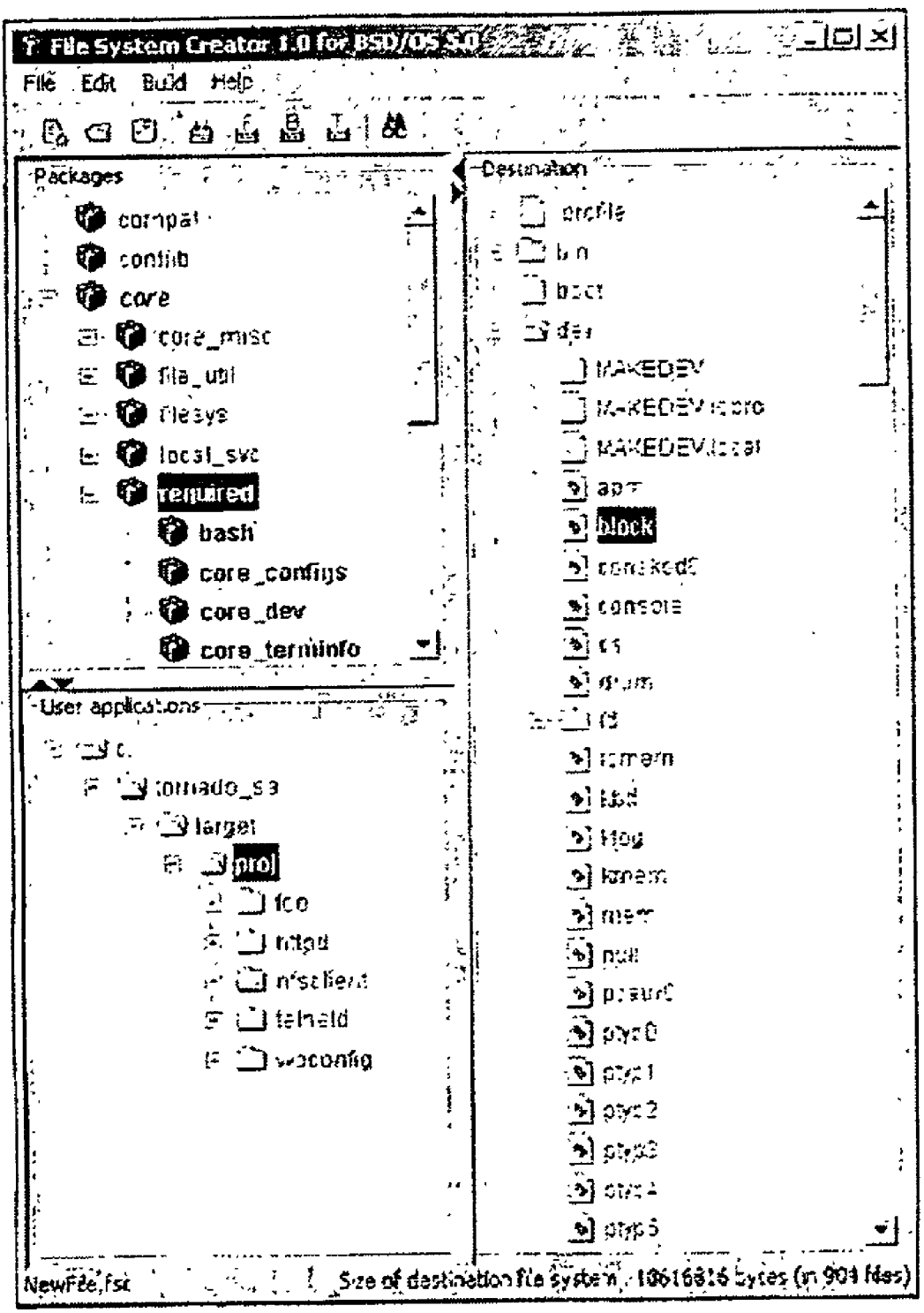
FIG. 14 illustrates the display of the location of the package in the destination panel when the package is selected in the first panel.

A destination tree 730 located in the third panel 720 displays any selected packages. The third panel 720 also displays any user application files that are selected. A package can be deleted with, for example, a mouse or with a keyboard event. Files that are listed in the package can also be deleted, for example, by a keyboard event or with the mouse. When a package is selected in the first panel, the location of the package in the destination panel 720 is shown and highlighted, as shown in FIG. 14. A file, directory, or package can be added to the destination panel 720 by selecting it and dragging it into the destination panel 720.

Figure 8:
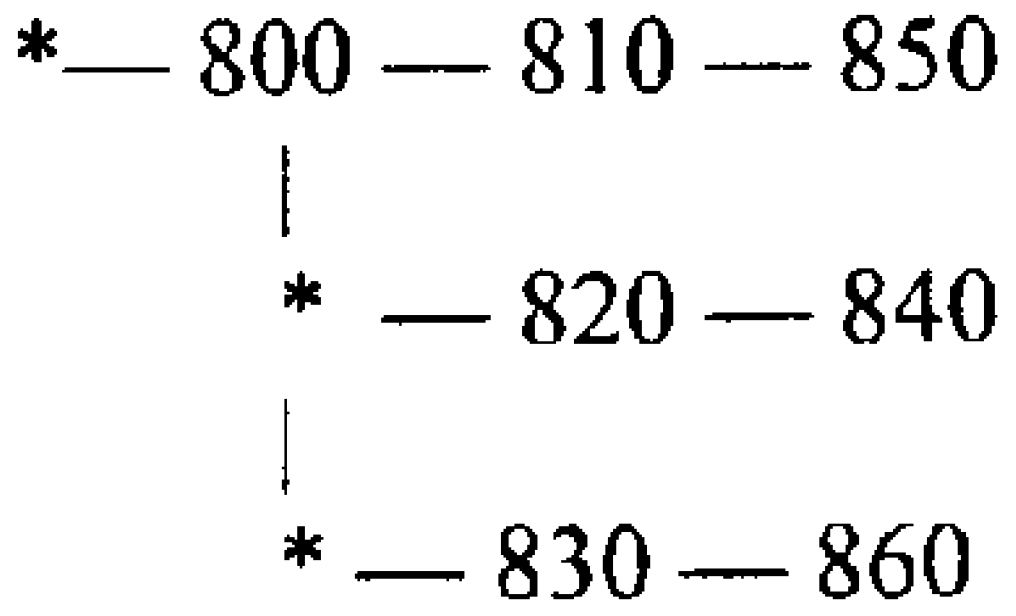

FIG. 8 shows an exemplary tree with first, second, third, fourth, and fifth default package 800,810,820,830,840. The exemplary tree could form part of the tree in the first panel 700 of the UI and is offered to show the package selection procedure of the UI. Also shown are a first and second optional package 850,860. If the user selects the first default package 800, the second, third, fourth, and fifth package 810,820,830,840 are also selected. If the user then deselects the second and fourth package 810,830, the first and second optional packages 850,860 are not deselected, since the first and second optional packages 850,860 were not selected when the user selected the first default package 800. However, if the user deselects the third package 820, the fifth package 840 is automatically unselected.

If the user had first selected the first optional package 850, the second default package 810 would have been automatically selected, but the first default package 800 would not have been selected. If the user then deselect the first optional package 850, the first default package 800 remains selected.

Preferably, default packages are not located below the optional packages in the hierarchy. For example, an optional package, then a default package, and then another default package is, preferably, an incorrect configuration. However, an optional package and then another optional package is, preferably, a correct configuration.

Figure 9:
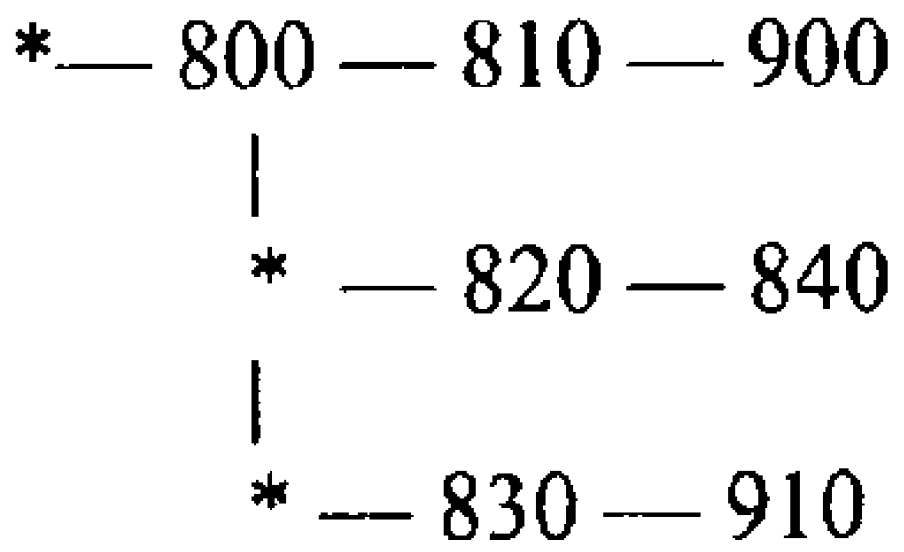

FIG. 9 shows the package selection procedure of the UI in the context of an exemplary tree showing duplicated packages. A first and second node 900,910 represent the same package. As in FIG. 8, the exemplary tree could form part of the tree in the first panel 700 or third panel 720 of the UI. If the user deselects the first node 900, the second node 910 is also deselected. Likewise, if the user deselects the second node 910, the first node 900 is also deselected. This works for default packages as well as optional packages.

Figure 10:
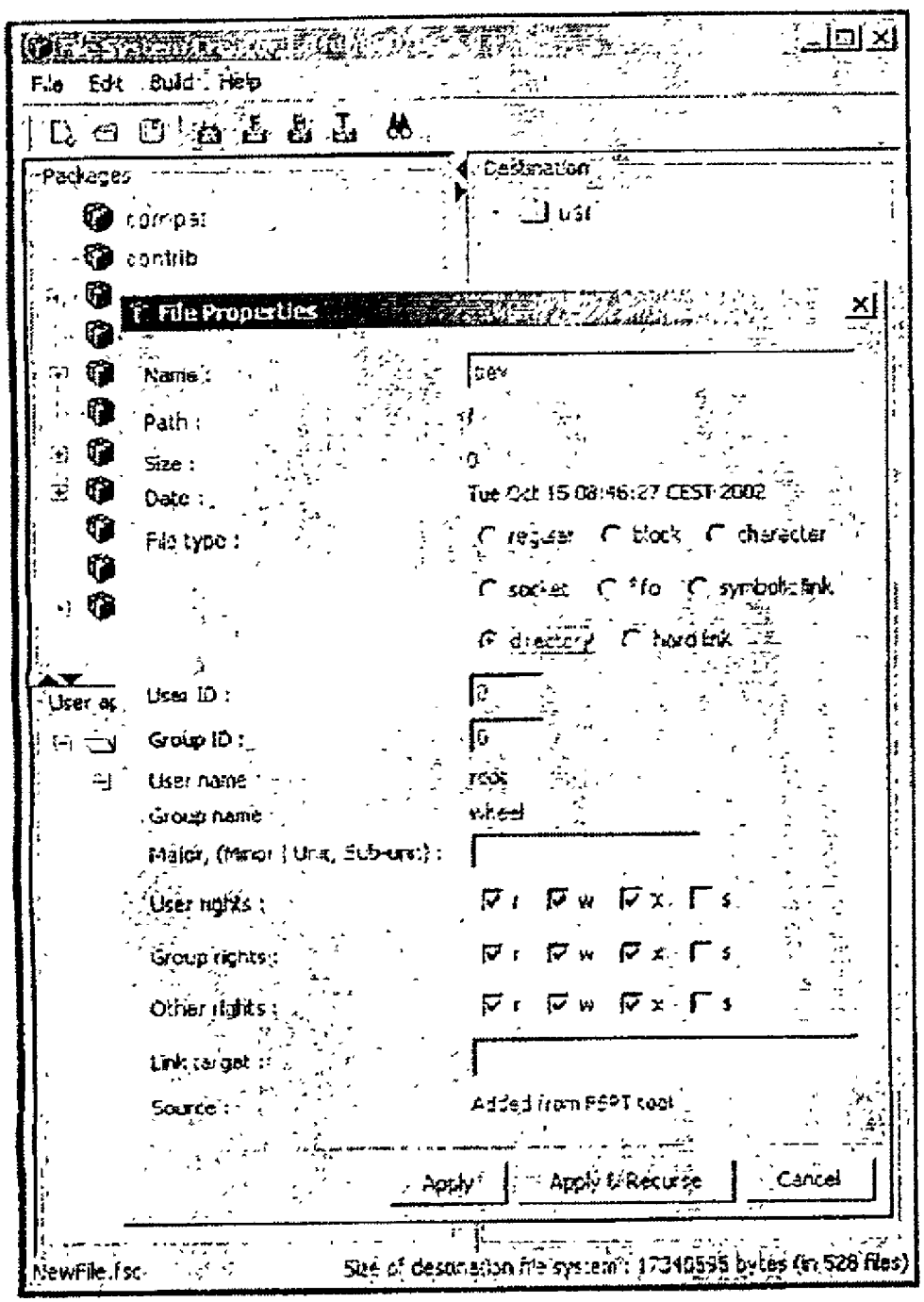
FIG. 10 shows a file properties pop up window.

FIG. 10 shows a file properties pop-up window. The file properties window can be activated by selecting a file and then entering a specific keyboard or mouse event (e.g., right mouse click). The name, path, size, file type, user ID, group ID, user name, group name, version number, user rights, group rights, other rights, target link, and source of the file can be displayed. For file type, a user could check regular, block, character, socket, FIFO, symbolic link, directory, or hard link. When the file system is created, the information pertaining to the particular file is implemented in the file system. For example, data for emulation of UNIX special files or characteristics specific to UNIX files is placed in the internal database of the emulation library 220, described above with reference to FIG. 2.

Figure 11:
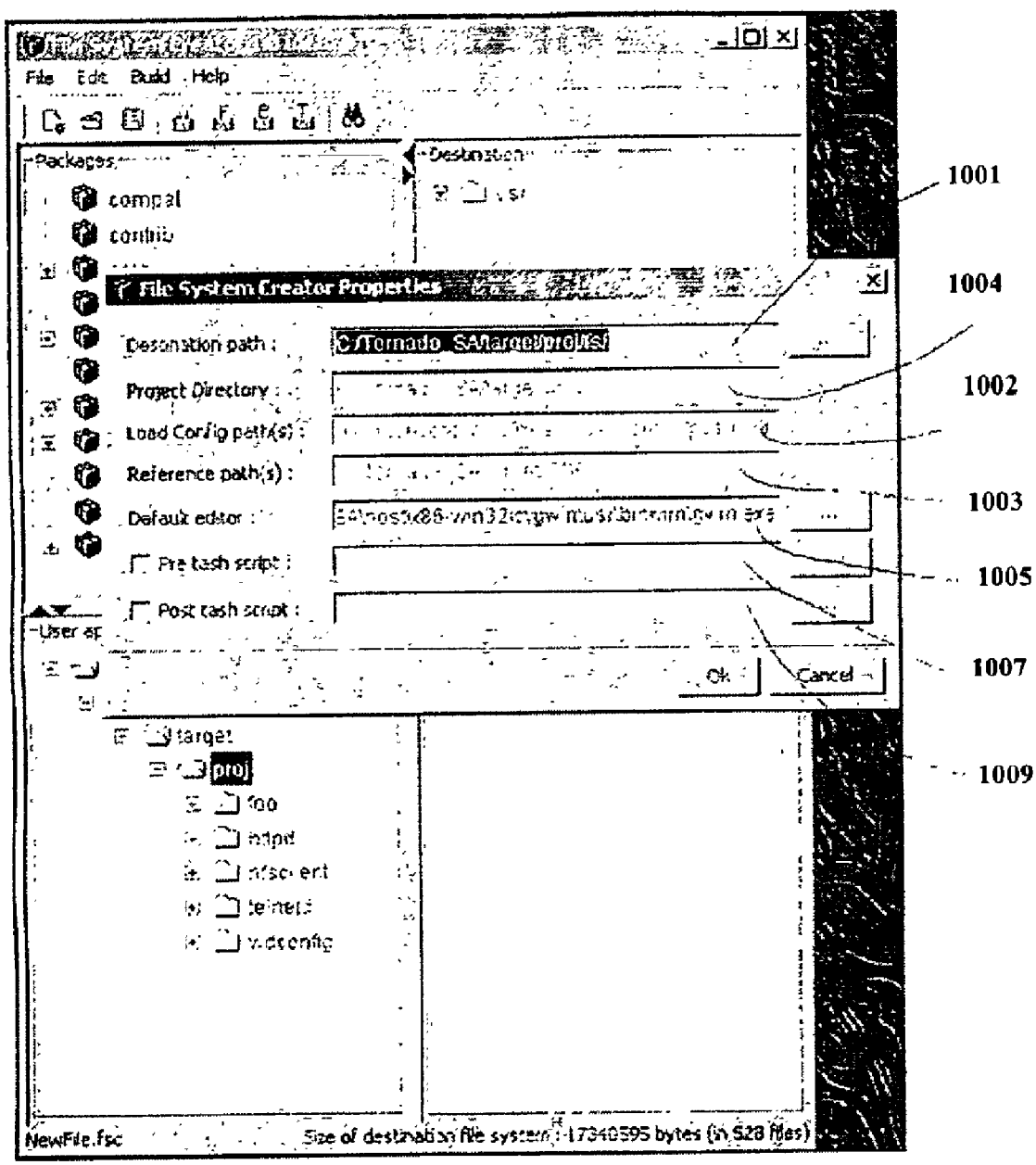
FIG. 11 shows a file system creator properties pop up window.

FIG. 11 shows a file system creator properties pop up window. The file system creator properties pop up window can be activated by selecting a menu item or icon. This window allows a user to specify different properties of the file system that is created. For example, a user can specify a destination path 1001, a load config path 1002, and a reference path 1003. A user can also specify a project directory 1004, a default editor 1005, pre-tash script 1007, and a post tash script 1009. The file system creator properties pop up window allows a user to create a file system. Preferably, the file system can be created as i) a set of files organized under a tree structure; ii), a binary file system (e.g., a unique file which contains the file system and that can be flashed in an EPROM), or iii) a bootable file system (e.g., a unique file which contains the file system and that can be booted when starting the computer).

Figure 12:
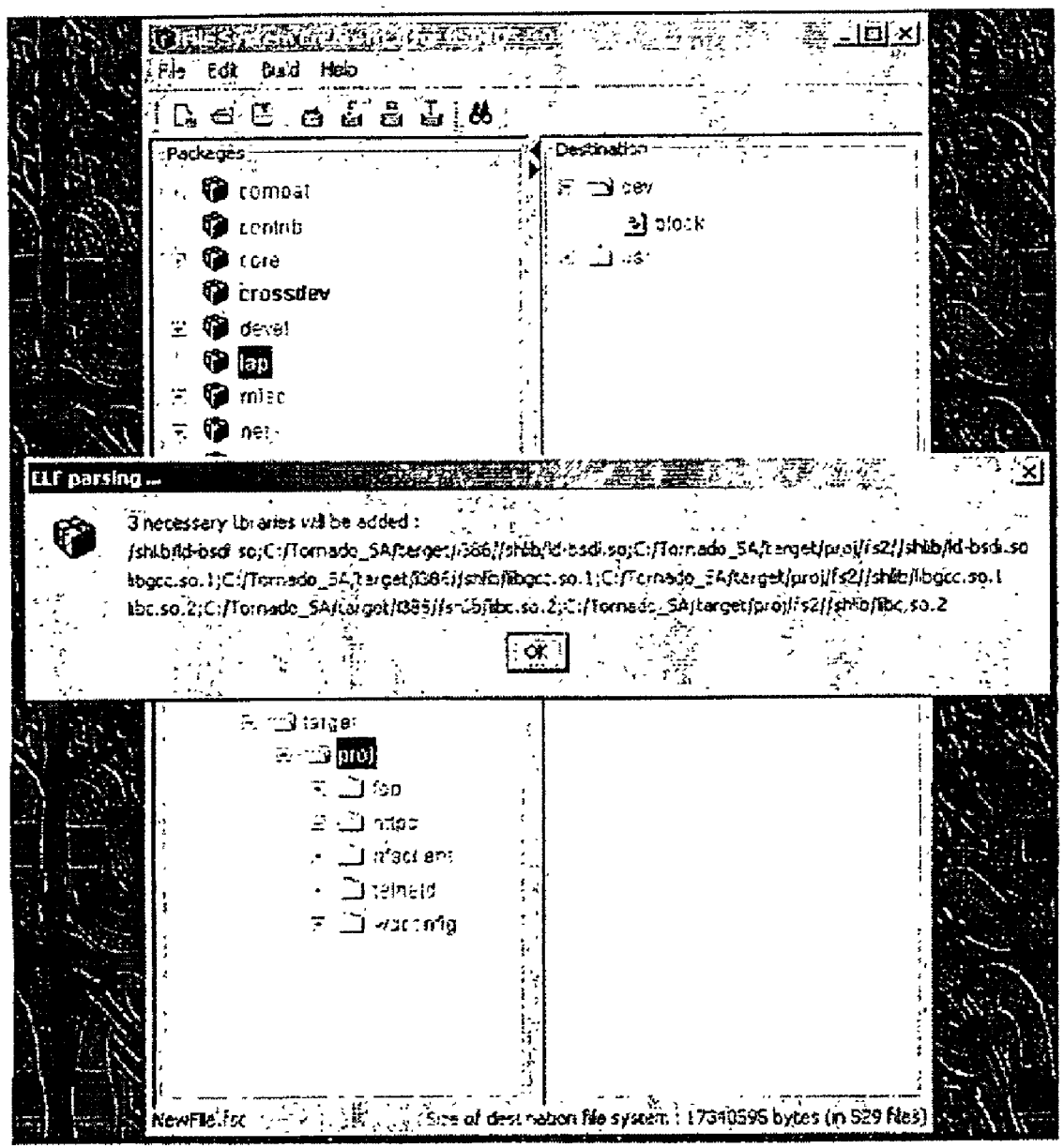
FIG. 12 shows an information pop up window.

Once a user selects to start creating the file system, for example, by a keyboard event or mouse selecting a button or icon, an information window is displayed. The information window is shown in FIG. 12. The information window displays libraries that will be added to the target system and the paths of the libraries. The information window also displays any missing libraries that have been detected, for example, by an "elf parsing" process. As one of ordinary skill in the art will appreciate, an "elf parsing" process is a process, coded in ELF, that parses the data of an executable (or library) file to retrieve the dependencies of the file. In this case, the elf parsing process parses the executables (and libraries) to be included in the file system, and, based upon the dependencies retrieved, the file system creator identifies any libraries that are missing. The missing libraries can then be included in the destination file system.

Figure 13:
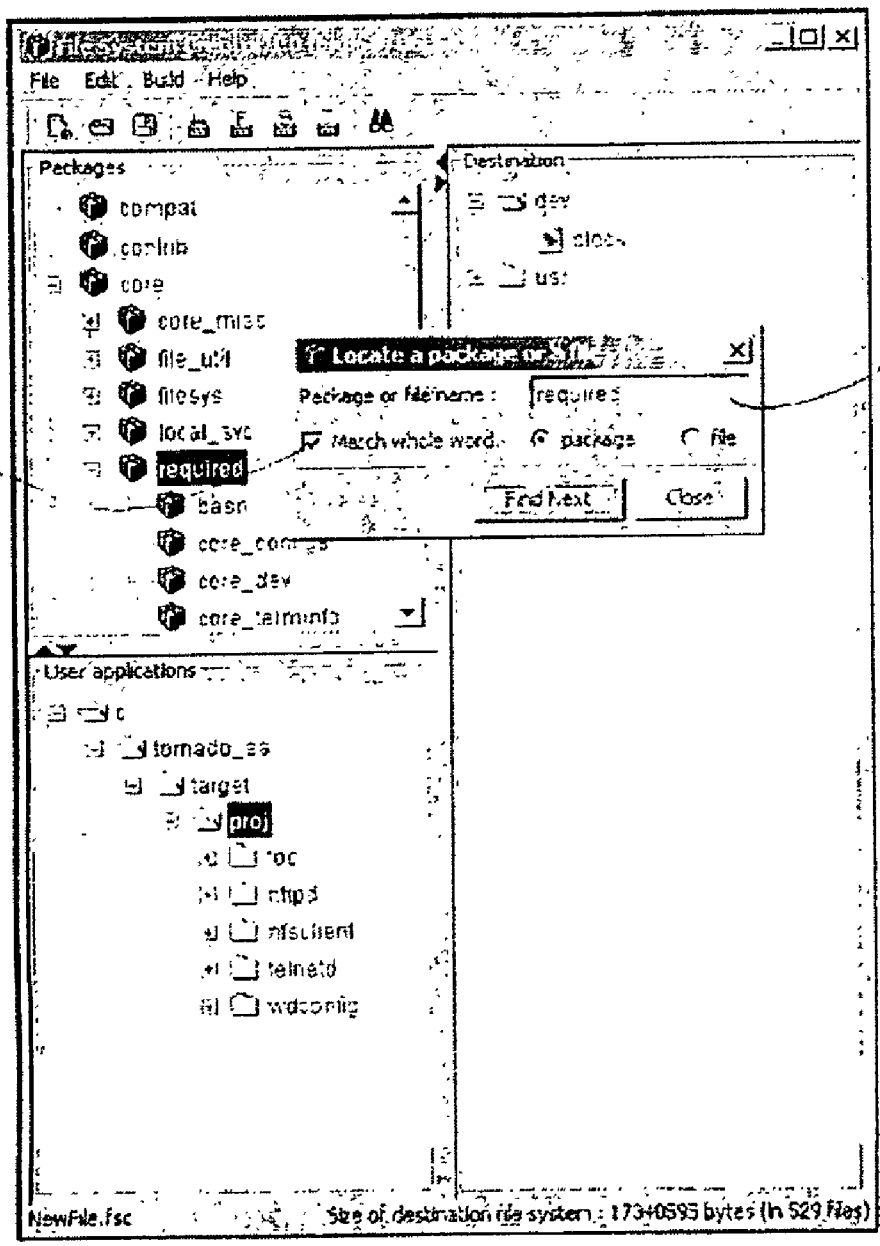
FIG. 13 shows a find package pop up window.

In certain embodiments according to the present invention, a find facility exists to retrieve a package within the file system. When the find facility is activated, for example, by a keyboard event, a find package pop up window is activated. FIG. 13 shows such a find package pop up window. A user can enter the package name in a first field 900. A user can also specify whether or not to match the entire word entered in the first field 900 via a check box 905. Preferably, the check box 905 also allows a user to specify whether the entire-word corresponds to a package or a file. In certain embodiments according to the present invention, the package name field is automatically configured based on a currently selected package.

Figure 15:
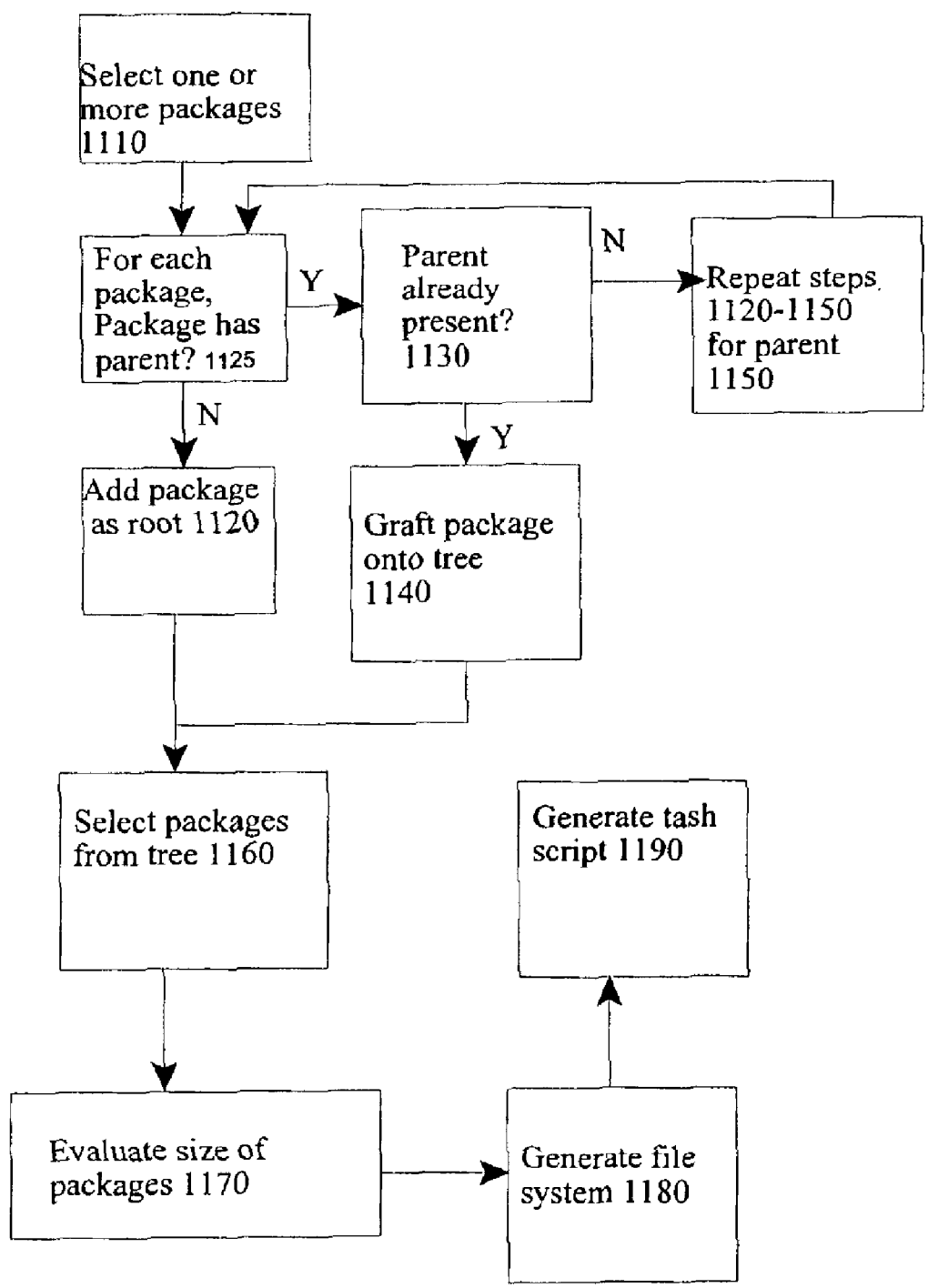
FIG. 15 is an illustrative flow chart for a method of generating a file system in accordance with an embodiment of the present invention.

FIG. 15 is an illustrative flow chart for a method of generating a file system in accordance with an embodiment of the present invention. One or more packages (e.g., *.def files) are selected (Step 1110). For example, a user could make a selection or a particular memory location could be read.

For each package, a determination is made as to whether the package files have a parent (Step 1120). For example, a check can be made to determine if the PARENT field in the package file is non-existent, empty, or refers to a non-existent file. If the package has no parent, it is placed as a root of one or more trees (Step 1125). Next, for any package that has a parent(s), a check is made to determine if the parent(s) for the particular package is already present in the tree (Step 1130). If the parent(s) is present in the tree, the package is grafted onto the tree below the parent(s) (Step 1140). If the parent(s) is not present in the tree, the package for each parent is located and Steps 1120–1150 are repeated for the parent with the parent now being the package (Step 1150). Preferably, the tree is built recursively. In the embodiment of the present invention using the UI, the tree can be viewed in the first panel 700.

One or more of the packages from the tree are then selected (Step 1160). In an embodiment of the present invention using a UI, the selection can be done by selecting any of the packages in the first panel 700 and dragging them to the third panel 720. Preferably, based on the selection, other packages are also selected, for example, as shown in FIGS. 9 and 10. Also, in the embodiment using the UI, project files from the second panel 710 can be selected by dragging the project files to the third panel 720. Preferably, the selection of the packages can be saved. The selection could then be loaded at a later time.

The size of the packages (e.g., the file system) that are currently selected is then evaluated (Step 1170). Step 1170 can be performed by a system size evaluation tool. Preferably, a user can select this option by pressing a button or selecting a menu item on the UI.

The file system is generated based on the selected files (Step 1180). During Step 1180, the files that are in the packages are placed in the correct directories (the directories can be created if they are not already present) of the host and entries are made in the database for any features of the files that are not supported by the host file system. For example, the directory structure on the host system, shown in FIG. 4, can be built. Specifically, the directory structure on the host system (e.g., a Win32 file system) can be generated so that it emulates a UNIX directory structure. For example, hard links, device files, and soft links could be present in the directory structure of the host system 190. Data for emulation of the hard links, device files, and soft links could be added to the emulation library 220 during Step 1180, so that the hard links, device files, and soft links can be emulated on the host system 190. Also, files can be written to the host system 190, and data particular to said files can be written to the emulation library 220. Specifically, files that are used in a UNIX file system can be written to the file system of the host system 190, for example, a Win32 file system. The characteristics of the files that are not supported by the file system of the host system 190 are written to the emulation library 220, so that the file can be emulated by the host system 190. For example, to emulate, on the host system 190, a file in a non-native format (e.g., a UNIX file on Win32 file system), the file is written to the host system 190 and data relating to any characteristics of the file are written to the emulation library 220 (describe in more detail in U.S. application Ser. No. [218.1036], referenced above). Then, when the file is emulated, an emulator can access the emulation library 220 to obtain the data used for emulation. The database can be written in a text format or in a binary format. In certain embodiments of the present invention, the files themselves can also be written as a single text or binary file system file. An application that does not access the actual files, but instead accesses the file system or characteristics of the files could function by accessing the file system file. For example, an application that displays a directory could access the file system file instead of accessing the actual files.

Step 1180 can be performed by a file system generation utility. As described above, a user can select this option by pressing a button or selecting a menu item on the UI. The resulting file system can be used for debugging or developing an application for the target system. For example, an application that uses a file system different from the host system could execute on the target system, but use the file system generated by the file system creator on the host system. Such an application could then be debugged or evaluated. Also, an application that uses a file system different from the host system could be developed on the host system. When the application accesses files, the file system generated by the file system generation utility could be used.

In step 1190, a tash script is built. Preferably, a tash script is also generated when file attributes are changed or files are deleted. The tash script can then be used to generate a destination file system (e.g., on the target system) or the same file system on a different device (e.g., a file system with UNIX characteristics on a Win32 file system could be built on another Win32 file system by interpreting the tash script). If the tash script is used to generated the destination file system, a tash interpreter on the host system is used to read the tash script and generate the destination file system. Preferably, the tash commands are visible in a box displayed on the user interface, as illustrated, for example, in FIG. 12.

In certain embodiments of the present invention, the file system can be transferred to the target without using the tash script. This can be done, for example, by copying all the files that were generated to the target file system. While the files are being copied, the database is consulted to determine any characteristics of the files that are not supported by the file system of the host, but are supported by the file system of the target. By doing so, the correct characteristics can be written to the files copied to the target system.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A computer implemented method for creating a second file system on a device implementing a first file system, comprising the steps of:

selecting one or more first files, from a set of files, the files comprising one or more characteristics particular to the second file system;

selecting, automatically, one or more ancestors of the first files, the ancestors comprising one or more characteristics particular to the second file system; and based on the first files and the ancestors, generating a data to emulate one or more of the first files and the ancestors, and/or characteristics of one or more of the first files and the ancestors, that the first file system does not support; and generating the second file system comprising the first files, ancestors, and the data.

2. The method as recited in claim 1 wherein the first file system is a Win32 file system.

3. The method as recited in claim 1 wherein the second file system is a UNIX file system.

4. A computer implemented method for creating a second file system on a device implementing a first file system, comprising the steps of:

selecting one or more first files, from a set of files, the files comprising one or more characteristics particular to the second file system;

selecting, automatically, one or more ancestors of the first files, the ancestors comprising one or more characteristics particular to the second file system; and based on the first files and the ancestors, generating a data to emulate one or more of the first files and the ancestors, and/or characteristics of one or more of the first files and the ancestors, that the first file system does not support;

generating a script based on the first files, ancestors, and the data; and generating the second file system comprising the first files, ancestors, and the data.

5. The method as recited in claim 4 wherein the script is a tash script.

6. A computer implemented method for creating a second file system on a device implementing a first file system, comprising the steps of:
selecting one or more first files, from a set of files, the files comprising one or more characteristics particular to the second file system;
selecting, automatically, one or more ancestors of the first files, the ancestors comprising one or more characteristics particular to the second file system; and
based on the first files and the ancestors, generating a data to emulate one or more of the first files and the ancestors, and/or characteristics of one or more of the first files and the ancestors, that the first file system does not support; and
generating the second file system comprising the first files, ancestors, and the data at a first location.

7. The method of claim 6, wherein the first location is on the first device.

8. The method of claim 6, wherein the first location is on the second device.

9. The method of claim 6, wherein the first location is on a third device.

10. The method of claim 6, wherein the first file system is a Win32 file system.

11. The method of claim 6, wherein the second file system is a UNIX file system.

12. The method of claim 6, wherein the step of generating the second file system further comprises generating a tash script.

13. The method of claim 12, wherein the step of generating the second file system further comprises using a tash interpreter to generate the second file system at the first location based upon the tash script.

14. The method of claim 13, wherein the tash interpreter is implemented on a second device.

15. The method of claim 13, wherein the tash interpreter is implemented on the first device.

16. A computer implemented method for creating a second file system on a first device implementing a first file system, comprising the steps of:
selecting one or more first files, from a set of files, the files comprising one or more characteristics particular to the second file system;
selecting, automatically, one or more ancestors of the first files, the ancestors comprising one or more characteristics particular to the second file system; and
based on the first files and the ancestors, generating a data to emulate one or more of the first files and the ancestors, and/or characteristics of one or more of the first files and the ancestors, that the first file system does not support; and
generating a file system comprising the first files, ancestors, and the data on a second device.

17. The method of claim 16, wherein the step of generating a file system further comprises generating the second file system on the first device, and thereafter, transferring the file system to the second device.

18. The method of claim 17, wherein the step of generating the second file system further comprises generating a tash script.

19. The method of claim 18, wherein the step of generating the second file system further comprises using a tash interpreter to generate the second file system on the second device based upon the tash script.

20. The method of claim 19, wherein the tash interpreter is implemented on the first device.

21. The method of claim 16, wherein the first file system is a Win32 file system.

22. The method of claim 16, wherein the second file system is a UNIX file system.

23. A computer implemented tool for creating a second file system on a device implementing a first file system, the tool being executable to select one or more first files, from a set of files, the files comprising one or more characteristics particular to the second file system; select, automatically, one or more ancestors of the first files, the ancestors comprising one or more characteristics particular to the second file system; based on the first files and the ancestors, generate a data to emulate one or more of the first files and the ancestors, or characteristics of one or more of the first files and the ancestors, that the first file system does not support; and generate the second file system comprising the first files, ancestors, and the data.

24. Computer readable media, having stored thereon, computer executable process steps operative to control a computer to perform the steps of:
selecting one or more first files, from a set of files, the files comprising one or more characteristics particular to the second file system;
selecting, automatically, one or more ancestors of the first files, the ancestors comprising one or more characteristics particular to the second file system; and
based on the first files and the ancestors, generating a data to emulate one or more of the first files and the ancestors, or characteristics of one or more of the first files and the ancestors, that the first file system does not support; and
generating the second file system comprising the first files, ancestors, and the data.

* * * * *